March 29, 1955 J. B. CAMP ET AL 2,705,302
APPARATUS FOR CONTINUOUSLY TESTING THE MAGNETIC
COMPONENTS OF A TRAVELING BED OF MATERIAL
Filed Sept. 2, 1953 2 Sheets-Sheet 1
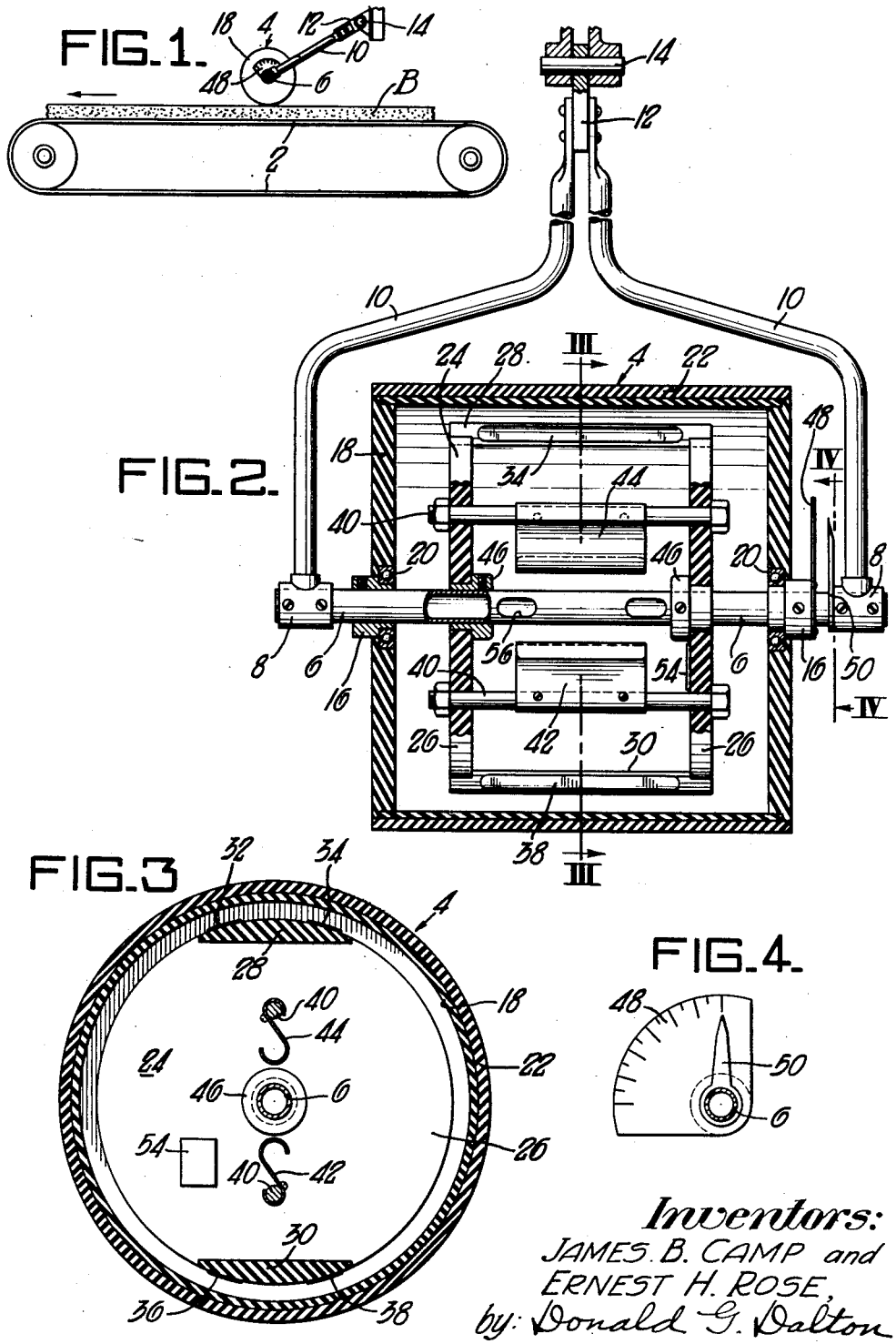
Inventors:
JAMES B. CAMP and
ERNEST H. ROSE,
by: Donald G. Dalton
their Attorney.

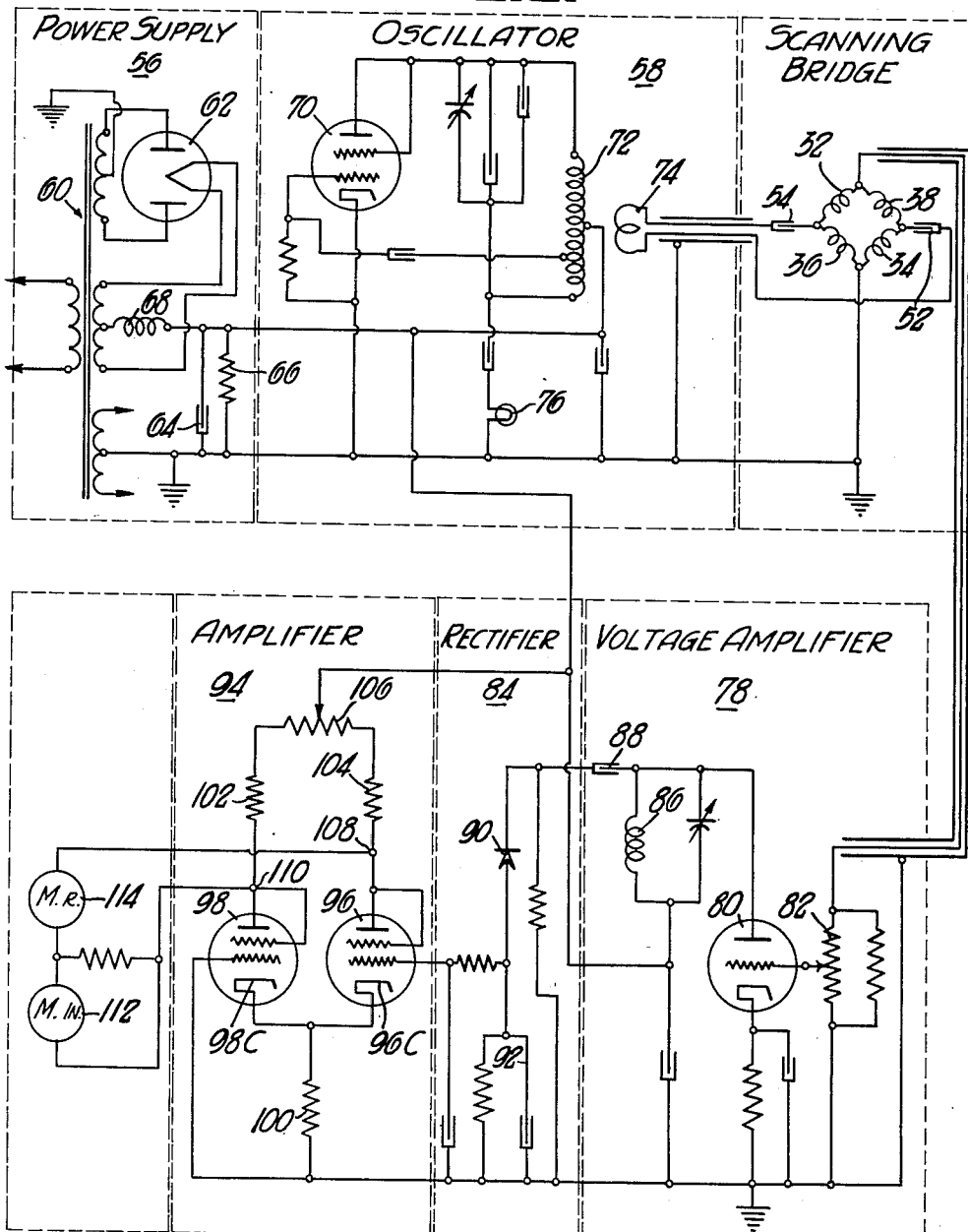

United States Patent Office 2,705,302
Patented Mar. 29, 1955

2,705,302

APPARATUS FOR CONTINUOUSLY TESTING THE MAGNETIC COMPONENTS OF A TRAVELING BED OF MATERIAL

James B. Camp, Fairfield, and Ernest H. Rose, Birmingham, Ala., assignors to United States Steel Corporation, a corporation of New Jersey Application September 2, 1953, Serial No. 378,104

5 Claims. (Cl. 324—34)

This invention relates to apparatus for continuously testing the magnetic components of a traveling bed of material such as iron ore sinter. Such sinter is used in blast furnaces where the strength of the material is very important to the proper functioning of the furnaces. Prior to our invention it was necessary to make strength tests on batches of the sinter. This destroyed the samples and it was not possible to determine the strength of the sinter continuously. We have discovered that the magnetic content of the sinter is an index of its strength and have developed the present apparatus for determining the strength continuously.

It is an object of our invention to provide apparatus which can continuously test the magnetic components of a traveling bed of material without destroying the material.

This and other objects will be more apparent after referring to the following specification and attached drawings, in which:

Figure 1 is a schematic view of our invention as applied to a traveling bed of ore sinter;

Figure 2 is a sectional view of the scanning element of our invention;

Figure 3 is a sectional view taken on the line III—III of Figure 2;

Figure 4 is a view taken on the line IV—IV of Figure 2; and

Figure 5 is a schematic wiring diagram used in our invention.

Referring more particularly to the drawings, the reference numeral 2 indicates a conveyor over which passes a bed B of iron ore sinter or other material containing a magnetic component. A scanning element 4 is pivotally mounted above the bed B. As best shown in Figures 2 and 3 the scanning element 4 consists of a cold rolled hollow steel shaft 6 having a T 8 attached to each end thereof by means of set screws. One end of a bent tube 10 is threaded into each T. The free ends of the tubes 10 are flattened and receive a link 12 therebetween. The link 12 is pivotally mounted on a pin 14. A pair of hubs 16 are held in spaced relationship on the shaft 6 by means of set screws. An outer dielectric cage 18 is rotatably supported on the shaft 6 by means of bearings 20. The periphery of the outer cage 18 is covered with a rubber covering 22. An inner cage 24 is mounted on the shaft 6 within the outer cage 18. The cage 24 consists of spaced apart dielectric discs 26 connected by means of top and bottom coil holders 28 and 30 which are also made of a dielectric material. Coils 32 and 34 are fastened to the upper coil holder 28 and coils 36 and 38 are fastened to the lower coil holder 30. Brass rods 40 extend between and are fastened to the discs 26. A neutralizing adjustment member 42 made of an electrically conductive magnetic substance such as soft iron is secured to the lower rod 40 and a neutralizing adjustment member 44 made of an electrically conductive non-magnetic substance such as aluminum is secured to the upper rod 40. The discs 26 are fastened to the shaft 6 by means of brass hubs 46 which are fastened to the shaft 6 by means of set screws. The position of coil holders 28 and 30 with respect to the shaft may be varied to change the position of the coils 32, 34, 36 and 38 with respect to the bed of material B. The position of the coil holders is indicated by means of a dial 48 secured to one of the hubs 16 and a cooperating pointer 50 fastened to the adjacent T 8. Condensers 52 and 54 are fastened to opposite discs 26. The shaft 6 is provided with openings 56 between the discs 26 for passage of wires, not shown.

As shown in Figure 5 the four identical coils 32, 34, 36 and 38 are electrically balanced in a standard bridge circuit. The condensers 52 and 54 are arranged in series with each of the electrical bridge input points to insure correct impedance match and thus obtain correct energy transformation at these points. The excitation for the four inductor coils of the scanning bridge is provided from a power supply 56 through an oscillator 58. As shown, power supply 56 consists of a power transformer 60, rectifier tube 62 and an associated filter system consisting of a condenser 64, resistor 66 and choke coil 68. The primary of the transformer 60 is connected to a 115 volt 60 cycle power source. Power supply 56 also supplies the heater voltage for the electronic tubes of the circuit. As shown, the oscillator 58 consists of an electronic tube 70, an oscillator coil 72, a link coil 74, which is wound over the coil 72 and a neon bulb 76 with the necessary condensers and resistances. The neon bulb 76 indicates whether or not the oscillator is operating. The coil 74 is connected to the scanning bridge through the condensers 52 and 54. The output of the scanning bridge is connected to a standard voltage amplifier 78. As shown, the voltage from the scanning bridge is supplied to the grid of a tube 80 through a voltage divider 82. The voltage is amplified in the amplifier 78 and transferred to a rectifier 84. A resonant circuit 86 consisting of a coil and variable condenser is provided in the plate of the amplifier tube 80 to nullify the effects of the second harmonic frequency which occurs especially at low signal inputs to the amplifier. The amplified voltage from the tube 80 is passed through a coupling condenser 88 to the rectifier and filter circuit 84 which converts the radio frequency into a direct current voltage. This rectifier and filter circuit contains a germanium diode 90 and associated resistors and condenser. The circuit also includes a damping network 92 consisting of a resistor and condenser connected in parallel to prevent quick signal changes from being readily seen. This direct current voltage, which is proportional to the initial radio frequency signal from the amplifier circuit, is transferred to a stable balanced amplifier or meter circuit 94 which includes two triode tubes 96 and 98. The tubes 96 and 98 increase the sensitivity of the meter circuit. The direct current from the rectifier filter circuit 84 appears on the grid of the tube 96. The grid of the tube 98 is grounded. The cathodes 96C and 98C are tied together and connected to a resistor 100. As the voltage on the grid of tube 96 is driven positive in respect to ground, more current flows in the tube and an increase in voltage appears across the common cathode resistor 100. As a result, the grid of tube 98 is biased more negative and less current will flow in the tube. At zero signal condition equal current will be passed by each tube. A zero set control resistor 102 is placed in series with each plate load circuit to insure that exact equal currents will pass by each of the tubes. Resistors 102, 104 and 106 are so connected that the current in resistor 102 decreases as the current increases in resistor 104. Leads from points 108 and 110 lead to an indicating meter 112 and recording meter 114 connected in series.

The operation of the device is as follows.

The scanning element 4 rides directly on the surface of the sinter bed near the discharge end of the sintering machine. The inner cage 24 remains stationary with the coils 36 and 38 being close to the bed B. The power supply 56 and oscillator 58 are arranged to provide a radio frequency of about 60 to 65 kilocycles as a source of energy for the bridge circuit. A source of energy of a lower frequency will result in a penetration effect of sufficient value to include the steel conveyor on which the sintered ore travels. A source of energy of a higher frequency will result in a capacity effect on the bridge circuit from the steel conveyor. Therefore, either a higher or lower frequency will give a false indication of the magnetic properties of the material. When the scanning head 4 is resting on the bed of material B a change in inductance of the coils results which unbalances the circuit in an amount proportional to the permeability of the bed, thus causing a flow of current through the potentiometer 82 and the amplifier 78. The output from the amplifier 78 is rectified by the rectifier 84, amplified in the stable balanced amplifier 94 and appears as an indicated quantity on meters 112 and 114. The scales on the meters 112 and 114 are linear and may be calibrated to read directly in terms of permeability of the sintered ore.

It will be understood that the power for the scanning bridge may be supplied from other sources and the output connected in a different manner to a meter or meters.

While one embodiment of our invention has been shown and described it will be apparent that other adaptations and modifications may be made without departing from the scope of the following claims.

We claim:

1. Apparatus for testing the magnetic components of a traveling bed of material comprising a shaft, a dielectric cylinder rotatably mounted on said shaft and adapted to rest on said material, a cage of dielectric material mounted on said shaft for movement therewith within said cyinder, a scanning bridge having four coils, two opposite coils of said bridge being mounted on said cage adjacent the point of contact with said bed of material, the two remaining coils being mounted on said cage remote from the point of contact with said bed of material, means for suppying power to said bridge, and a meter connected to the output of said bridge.

2. Apparatus for testing the magnetic components of a traveling bed of material comprising a shaft, a dielectric cylinder rotatably mounted on said shaft and adapted to rest on said material, a cage of dielectric material mounted on said shaft for movement therewith within said cylinder, said cage including spaced apart discs connected by diametrically opposite coil holders, a scanning bridge having four coils, two opposite coils of said bridge being mounted on one of said coil holders, the two remaining coils being mounted on the other of said coil holders, means to supply power having a frequency of approximately between 60 and 65 kilocycles to said bridge, and a meter connected to the output of said bridge.

3. Apparatus for testing the magnetic components of a traveling bed of material comprising a shaft, a dielectric cylinder rotatably mounted on said shaft and adapted to rest on said material, a cage of dielectric material mounted on said shaft for movement therewith within said cylinder, said cage including spaced apart discs connected by diametrically opposite coil holders, a scanning bridge having four coils, two opposite coils of said bridge being mounted on one of said coil holders, the two remaining coils being mounted on the other of said coil holders, a pair of capacitors mounted on said cage, means to supply power having a frequency of approximately between 60 and 65 kilocycles to said bridge, one of said capacitors being in each of the leads to said bridge, and a meter connected to the output of said bridge.

4. Apparatus for testing the magnetic components of a traveling bed of material comprising a shaft, a dielectric cylinder rotatably mounted on said shaft and adapted to rest on said material, a cage of dielectric material mounted on said shaft for movement therewith within said cylinder, said cage including spaced apart discs connected by diametrically opposite coil holders, a scanning bridge having four coils, two opposite coils of said bridge being mounted on one of said coil holders, the two remaining coils being mounted on the other of said coil holders, a pair of rods extending between and fastened to said discs, the axes of said rods being arranged substantially in the diametrical plane between said coil holders, a ferrous neutralizing adjustment member secured to one of said rods, an aluminum neutralizing adjustment member secured to the other of said rods, means to supply power having a frequency of approximately between 60 and 65 kilocycles to said bridge, and a meter connected to the output of said bridge.

5. Apparatus for testing the magnetic components of a traveling bed of material comprising a shaft, a dielectric cylinder rotatably mounted on said shaft and adapted to rest on said material, a cage of dielectric material mounted on said shaft for movement therewith within said cylinder, said cage including spaced apart discs connected by diametrically opposite coil holders, a scanning bridge having four coils, two opposite coils of said bridge being mounted on one of said coil holders, the two remaining coils being mounted on the other of said coil holders, a pair of rods extending between and fastened to said discs, the axes of said rods being arranged substantially in the diametrical plane between said coil holders, a ferrous neutralizing adjustment member secured to one of said rods, an aluminum neutralizing adjustment member secured to the other of said rods, a pair of capacitors mounted on said cage, means to supply power having a frequency of approximately between 60 and 65 kilocycles to said bridge, one of said capacitors being in each of the leads to said bridge, and a meter connected to the output of said bridge.

References Cited in the file of this patent

UNITED STATES PATENTS

| | | |
|---|---|---|
| 1,907,755 | Drake | May 9, 1933 |
| 1,925,904 | Mayne | Sept. 5, 1933 |